A. R. BANNISTER & T. G. JOHNS.
VARIABLE DRIVING GEAR.
APPLICATION FILED JULY 3, 1912.
1,070,001.
Patented Aug. 12, 1913.
2 SHEETS—SHEET 1.
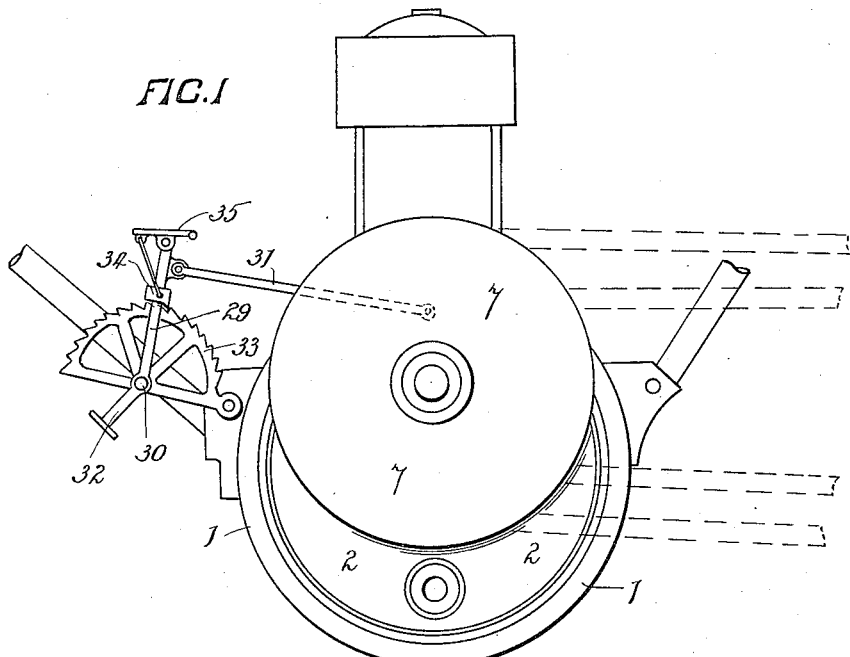
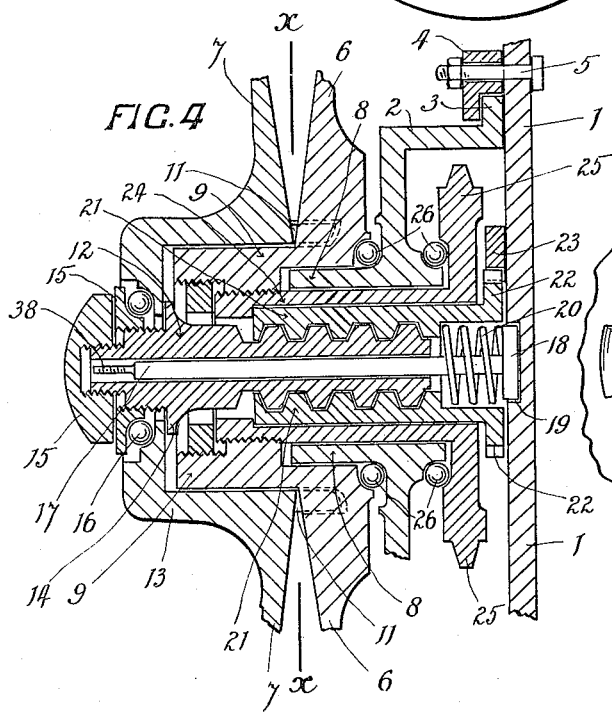
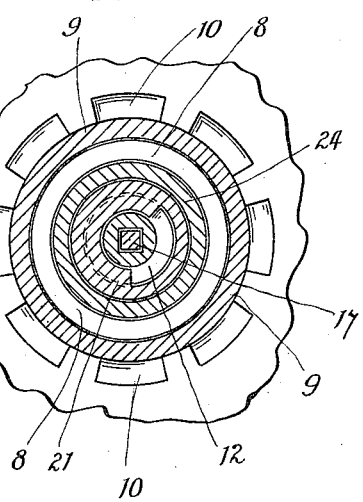
Witnesses:
L. H. Staaden.
Anna Hoyt.
Inventors:
Albert Richard Bannister
and Thomas George Johns A. R. BANNISTER & T. G. JOHNS.
VARIABLE DRIVING GEAR.
APPLICATION FILED JULY 3, 1912.
1,070,001.
Patented Aug. 12, 1913.
2 SHEETS—SHEET 2.
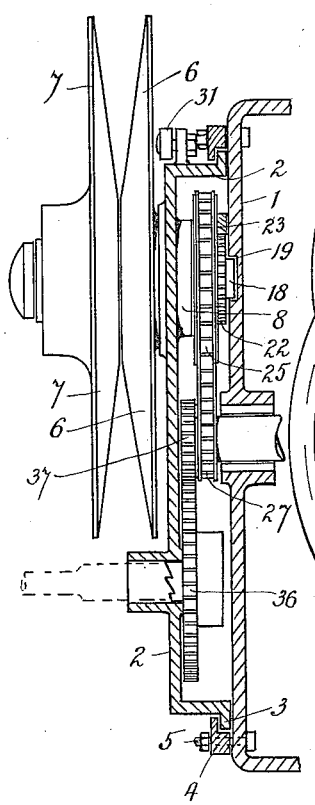
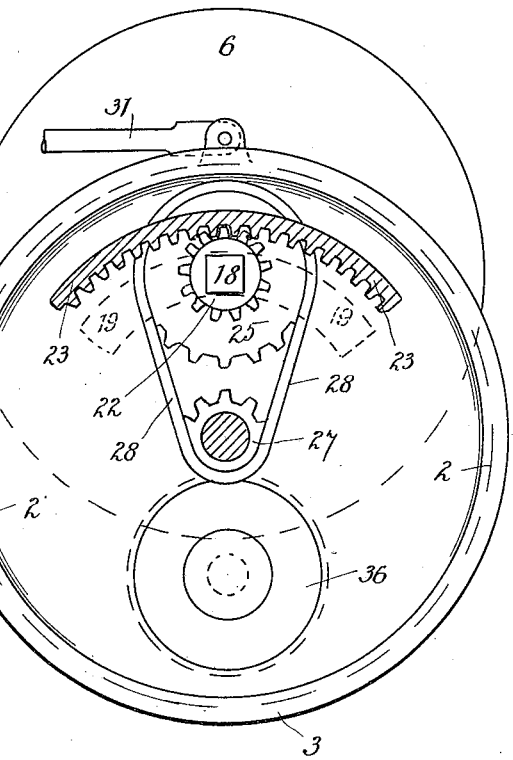
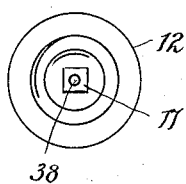
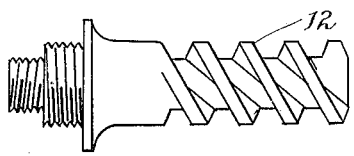
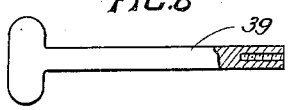

UNITED STATES PATENT OFFICE.

ALBERT RICHARD BANNISTER AND THOMAS GEORGE JOHNS, OF GISBORNE, NEW ZEALAND.

VARIABLE DRIVING-GEAR.

1,070,001.

Specification of Letters Patent. Patented Aug. 12, 1913.

Application filed July 3, 1912. Serial No. 707,405.

*To all whom it may concern:*

Be it known that we, ALBERT RICHARD BANNISTER and THOMAS GEORGE JOHNS, subjects of the King of Great Britain, residing at Gisborne, in the Dominion of New Zealand, have invented new and useful Improvements in Variable Driving-Gear; and we do hereby declare the following to be a full, clear, and exact description of the same.

This invention has been designed in order to provide for improvements in the driving gear of motor cycles and the like, by means of which the working diameter of the main driving pulley may be varied at the will of the cyclist, and which may also, if required, be adjusted to allow of the engine running free.

The invention embodies the employment of a driving pulley composed of a pair of disks mounted together and each formed with an inclined face on its inner surface so as to provide, with the other, a V shaped groove into which the driving belt fits. One of these disks is made adjustable in its distance from the other so as to widen or narrow the groove and thereby cause the belt to grip into a smaller or larger diameter and thus vary the power and speed transmitted.

The invention consists in a special construction of apparatus by means of which the pulley may be so adjusted, and in the operation of which, the slackness of the belt caused by the reduction in the driving diameter of the pulley will be automatically taken up and the tightening of the belt caused by the increase of such diameter, will also be automatically allowed for. This is effected by the pulley moving away from or toward the back wheel synchronously with the reduction or extension of its driving diameter.

In fully describing the invention, reference will be made to the accompanying sheet of drawings, in which:—

Figure 1 is a front elevation of the whole apparatus in its assembled condition. Fig. 2 is an end elevation of the gear. Fig. 3 is a back elevation thereof. Fig. 4 is a longitudinal section, on an enlarged scale, of the central portion of the driving pulley and its operating parts. Fig. 5 is a cross section thereof taken on the line x—x of Fig. 4. Figs. 6, 7 and 8 are details that will be hereinafter more fully described.

In carrying out the invention the usual gear case 1 is provided with a false front plate 2 mounted thereon and inclosing a space between it and the gear case. This false front is so secured to the gear case as to be held firmly thereon but in such a manner as to allow of it rotating. This may be effected in any suitable manner, as for instance, as by the means shown in the drawings in which the edge of the false front is formed with a flange 3 over which fits a ring 4 secured to the gear case by bolts 5.

The driving pulley is made of two disks 6 and 7 each one of which is formed with the inclined inner face shown. These disks are placed together so as to form the pulley having a V shaped space between them. The inner disk 6 as shown specially in Fig. 4, is journaled to rotate on a bush bearing 8 formed upon the front plate 2 and it is formed with an elongated boss 9 on its outer side on which the outer disk 7 is mounted so as to be free to move in and out. The inside face of the disk 6 is formed with a ring of recesses 10 close to its bearing (as shown in Fig. 5), and the outer disk is provided with an equal number of lugs 11 on its inner surface adapted to enter these recesses and thereby to lock the two disks together when the outer disk is moved in. When such outer disk is moved out it will free the inner disk and permit of it running free. The boss 13 of the outer disk 7 is secured upon the outer end of a screw threaded spindle 12 passing centrally through the bearing 8. This spindle is shown in elevation in Fig. 6 and in end elevation in Fig. 7. The boss 13 is attached to this spindle by being confined between a shoulder 14 thereon and the nut 15, suitable ball races and balls 16 being provided to permit of the disk's free rotation upon the spindle. Extending centrally through the spindle is a squared bar 17 fitting into a correspondingly shaped bore. The inner end of this bar is carried through and is provided with a square enlarged head 18 that fits into a curved groove 19 formed in the gear case 1 and extending concentrically with the front plate 2 as shown by the dotted lines in Fig. 3. This head is kept within the groove by means of the spring 20 and it serves to hold the bar and the spindle from rotation while permitting it to move to and fro along the groove 19.

Surrounding the spindle 12 is a sleeve 21 internally threaded to fit the screw and which at its inner end passes into the space inclosed by the front plate 2 and is provided with a tooth pinion 22. A segmental rack 23 (Fig. 3) is arranged concentrically upon the face of the gear case 1 and secured thereto. This rack gears with the pinion 22 and serves to cause it and the sleeve 21 to rotate on its own axis when the plate 2 is swung around in the manner provided for and to be hereinafter explained. The rotation of this sleeve 21 will therefore cause the spindle 12 to move in or out along the bar 17 by reason of the screw threaded engagement of the spindle in the sleeve. This will cause the outer disk 7 of the driving pulley to be moved toward or away from the inner disk 6 according to the direction of rotation of the sleeve, and thereby lessen or widen the V shaped gap between the disks.

The inner disk 6 is screwed upon a second sleeve 24 mounted between the sleeve 21 and the bearing 8 so as to be free to rotate between them. The inner end of this sleeve is provided with a sprocket wheel 25 positioned within the space inclosed by the front plate 2. Its outer end is made to slightly overlap the outer end of the sleeve 21 and thus to keep such sleeve from any longitudinal movement. Suitable ball races and balls 26 are arranged between the bearing 8 and the disk 6 and between the inner end of such bearing and the sprocket wheel 25.

The driving shaft of the engine passes out through the center of the gear case 1 and is provided on its end with a sprocket pinion 27. A sprocket chain 28 encircles this pinion and the sprocket wheel 25 and thus communicates the motion of the engine to the inner disk 6 of the driving pulley. When therefore the outer disk is moved in to lock with the inner disk both disks will travel together and drive the belt placed between them. When the outer disk is moved right out to free the inner disk, the driving belt will rest on the lugs 11 thereof and thus permit of the inner disk running free and providing for a free engine.

The rotation of the sleeve 21 to actuate the spindle 12 is, as has been described, effected by the rotation of the front plate 2 carrying the gearing with it in a concentric direction and causing the pinion 22 to engage with the rack 23 as it moves around and thus to give it the rotation required. The forward movement of the plate is designed to so rotate the sleeve as to cause the spindle 12 to move outward and thereby reduce the driving diameter of the pulley, while the reverse movement is designed to cause it to move inward and increase the driving diameter of the pulley. Suitable means are provided for thus moving the plate forward, while the rear movement is made dependable upon the strain on the driving belt. These means are shown in Fig. 1. They consist of an arm 29 pivoted on a fixed pin 30 and connected by the rod 31 with the plate 2. This arm is attached to a pedal crank 32 by the operation of which the arm may be forced forward. The arm travels past a fixed segmental ratchet bar 33 and is provided with a pawl 34 adapted to engage with such ratchet and prevent any rearward movement of the arm. Thus when the arm is forced forward its pawl will engage with the ratchet and retain it in such position. A small foot lever 35 is pivoted on the top of the arm and attached to the pawl 34. By depressing this lever, the pawl may be raised from engagement with the ratchet and thereby permit of the arm moving back. Consequently, in the operation of the mechanism, to reduce the speed, the rider will force the arm 29 forward to the required amount thus widening the distance between the disks composing the driving pulley. To increase the speed, the rider will release the pawl 34 and allow the tension on the driving belt to draw the plate 2 backward and thus to force the disks closer together and narrow the V groove between them. It will be seen therefore that with the reduction in the driving diameter of the pulley it will be moved farther away from the back wheel of the machine, thus taking up the slack in the belt caused by such reduction, while with the increase in the driving diameter it will be moved closer to such back wheel and provide the necessary slackness to pass around the increased diameter.

For use in cranking the engine, a gear wheel 36 (Figs. 2 and 3) may be mounted in a bearing upon the lower part of the plate 2 and such wheel arranged in gear with a pinion 37 made in one with the sprocket pinion 27 on the engine shaft. The spindle of the gear wheel is provided with a clutch face to receive the cranking handle. This will be required when the driving pulley is in the condition to permit of the engine running free.

In order to provide for an independent adjustment of the pulley, the outer end of the square rod is formed with a short threaded pin 38 adapted to be screwed into a key 39 (Fig. 8) inserted in the end of the spindle bore. When the key is thus screwed in, the rod may be drawn out against the action of the spring 20 and its square head 18 freed from the groove 19. The spindle may then be rotated in either direction within the sleeve 21 and thus moved in or out to adjust the pulley and take up or allow for any slackness in the driving belt.

The lugs 11 on the outer disk 7 are made of such a length in relation to the thickness of the driving belt as not to engage in the recesses of the disk 6 until the belt has first been gripped between the two disks, thus insuring that both disks shall be running together at the same speed and obviate any liability of jar in the engagement of the clutch.

What we do claim as our invention, and desire to secure as Letters Patent is:—

1. In variable driving gear, a supporting plate capable of rotation, a bearing bush extending therefrom, a driving pulley formed by an inner disk journaled on the bearing and an outer disk journaled on the inner disk and adapted to move to and fro in relation thereto, means for locking the two disks together, a screw threaded spindle extending through the bearing and connected at its outer end to the outer disk, a slide bar upon which the spindle is mounted, an internally screw threaded sleeve surrounding the spindle, a pinion upon the inner end of the sleeve, a fixed toothed rack with which the pinion gears and means whereby the supporting plate may be partially rotated, substantially as herein specified.

2. In variable driving gear, a gear case, a power shaft journaled therein, said gear case having a groove extending concentrically therewith, a segmental rack upon the gear case extending concentrically with such shaft, a supporting plate mounted to rotate on the front face of the gear case and concentrically with the power shaft, a bush bearing upon such plate, a driving pulley consisting of an inner disk journaled on the bush bearing, and an outer disk journaled on the inner disk and adapted to move to and fro in relation thereto, means for locking the two disks together, driving connections between the inner disk and the power shaft a screw threaded spindle extending centrally through the bush bearing, a sliding bar extending centrally through such spindle and fitting at its inner end into the groove in the gear case, an internally screw threaded sleeve surrounding the spindle and passing through the bush bearing a pinion upon the inner end of such sleeve gearing with the rack upon the gear case and means whereby the supporting plate may be partially rotated, substantially as specified.

3. In variable driving gear, a gear case, a power shaft journaled therein, a supporting plate capable of rotation mounted on the gear case, a bush bearing extending from such plate, a driving pulley formed by an inner disk journaled on the bush bearing and an outer disk journaled on the inner disk and adapted to move to and fro in relation thereto, driving connections between the inner disk and the power shaft, means whereby the rotation of the supporting plate will impart an inward or outward movement to the outer disk, a crank operated arm, mounted adjacent to the supporting plate, a connecting rod extending between the arm and the plate, a ratchet bar across which the arm moves and a pawl on the arm engaging with such ratchet bar, substantially as specified.

4. In variable driving gear, a driving pulley formed by two disks having inclined adjacent faces, and separately journaled, power receiving connections upon the inner disk, a hub upon the inner disk upon which the outer disk is mounted to move to and fro in relation to the inner disk, and means for locking the two disks together, in combination with a screw threaded spindle connected to the outer disk, means to move the spindle longitudinally a spring pressed rod running longitudinally through the screw-threaded spindle, and having a head, a gear case having means engaging the head to prevent the rotation of the rod, said rod having means at its other end for the attachment of a key whereby the rod may be operated against its spring, substantially as specified.

In testimony whereof, we have signed this specification in the presence of two subscribing witnesses.

ALBERT RICHARD BANNISTER.
THOMAS GEORGE JOHNS.

Witnesses:
PERCY GEORGE ANDREW,
FREDERICK HENRY WOHLERS CRAILL.